(12) United States Patent
Soryal et al.

(10) Patent No.: US 11,909,885 B2
(45) Date of Patent: Feb. 20, 2024

(54) PASSIVE OPTICAL NETWORK SECURITY

(71) Applicant: AT&T Intellectual Property I, L.P., Atlanta, GA (US)

(72) Inventors: Joseph Soryal, Glendale, NY (US); Dylan Chamberlain Reid, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 289 days.

(21) Appl. No.: 17/452,535

(22) Filed: Oct. 27, 2021

(65) Prior Publication Data

US 2023/0129621 A1    Apr. 27, 2023

(51) Int. Cl.
*H04L 9/32* (2006.01)
*H04L 9/06* (2006.01)
*H04L 9/14* (2006.01)

(52) U.S. Cl.
CPC .......... *H04L 9/3236* (2013.01); *H04L 9/0643* (2013.01); *H04L 9/14* (2013.01)

(58) Field of Classification Search
CPC ....... H04L 9/14; H04L 9/0643; H04L 9/3236; H04L 9/3226; G06F 21/88
See application file for complete search history.

(56) References Cited

U.S. PATENT DOCUMENTS

| | | | | |
|---|---|---|---|---|
| 10,419,422 | B2 * | 9/2019 | Sierra | H04L 9/3215 |
| 2003/0212893 | A1 * | 11/2003 | Hind | H04L 9/3247 |
| | | | | 713/177 |
| 2008/0101604 | A1 * | 5/2008 | Kocher | G11B 20/00659 |
| | | | | 380/210 |
| 2016/0156596 | A1 * | 6/2016 | Chen | H04L 69/04 |
| | | | | 713/168 |
| 2019/0288845 | A1 * | 9/2019 | Wah | G06F 21/88 |

* cited by examiner

*Primary Examiner* — Shanto Abedin

(57) ABSTRACT

Improved optical network security (e.g., using a computerized tool) is enabled. Various embodiments herein can send (e.g., via a network) to a group of network devices comprising a first network device and a second network device, a first encrypted data stream, a second encrypted data stream, a first hash code, and a second hash code, wherein the first network device deletes the second encrypted data stream after the first network device hashes the second encrypted data stream, and in response to the second network device being determined not to have received the second hash code within a defined threshold time, determine that the first network device is unauthorized to use the network.

20 Claims, 11 Drawing Sheets

PASSIVE OPTICAL NETWORK SECURITY

TECHNICAL FIELD

The disclosed subject matter relates to network security and, more particularly, to passive optical network security using data encryption.

BACKGROUND

Fiber-optic internet is increasingly utilized around the world. Fiber-optic internet can offer up to ten times the speed of traditional cable connections, if not more. However, existing optical networks rely on active routers or passive routers in order to distribute fiber connections. Active routers, however, require power connections, and can be inefficient and often unavailable at certain locations. Passive routers can eliminate the power connection requirement of active routers, but lack security features of active routers. Thus, when a conventional passive router is utilized, a bad-actor-neighbor could decrypt other traffic streams destined for other neighbors if said bad neighbor steals network keys or employs a sophisticated computer to decrypt such network keys. Further, existing systems rely on an honor system for discarding data destinated for a different node, which increases the risk of exploitation of such data.

The above-described background relating to optical network security is merely intended to provide a contextual overview of some current issues and is not intended to be exhaustive. Other contextual information may become further apparent upon review of the following detailed description.

DETAILED DESCRIPTION

Figure 1:
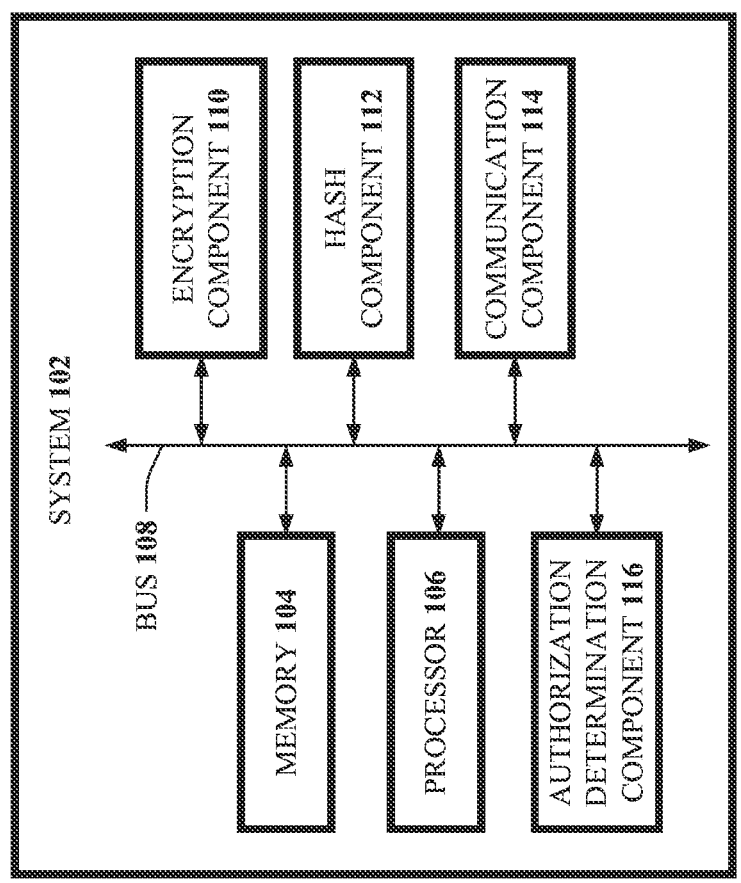
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, optical network security can be improved in various ways, and various embodiments are described herein to this end and/or other ends.

In various embodiments herein, when a device decrypts a network traffic stream intended for said device, other network traffic streams associated (e.g., concurrent sent) with the network traffic stream can be permanently discarded by said device. Further, when said device decrypts a network traffic stream, other devices can gain insight, in a distributed manner, into whether a bad actor encrypts traffic not intended for said bad actor.

According to an embodiment, a system can comprise a processor, and a memory that stores executable instructions that, when executed by the processor, facilitate performance of operations, comprising: generating a first encrypted data stream associated with first information and a second encrypted data stream associated with second information, generating a first hash code corresponding to the first encrypted data stream and a second hash code corresponding to the second encrypted data stream, wherein a decryption key corresponding to the first encrypted data stream comprises a combination of a key associated with a first network device and the second hash code, sending, via a network to a group of network devices comprising the first network device and a second network device, the first encrypted data stream, the second encrypted data stream, the first hash code, and the second hash code, wherein the first network device deletes the second encrypted data stream after the first network device hashes the second encrypted data stream, and in response to the second network device being determined not to have received the second hash code within a defined threshold time, determining that the first network device is unauthorized to use the network.

In various embodiments, the first network device can be determined to be unauthorized to use the network in response to the second network device being determined not to have received the second hash code from the first network device within the defined threshold time. In further embodiments, the first network device can be determined to be unauthorized to use the network in response to the second network device being determined not to have received the second hash code from the system within the defined threshold time.

In some embodiments, wherein the network can be a first network, and wherein the first network device can send the second hash code to the second network device via a second network, different from the first network. For example, the first network can comprise a fiber optic network. In this regard, the second network can also comprise a fiber optic network. In other embodiments, the second network can comprise a wireless radio frequency network.

In one or more embodiments, the system can further comprise a virtual machine that generates and sends encrypted data streams comprising the first encrypted data stream and the second encrypted data stream.

It is noted that the group of network devices can comprise respective virtual machines that generate and send encrypted hash codes based on encrypted data streams comprising the first encrypted data stream and the second encrypted data stream.

In various embodiments, the above operations can further comprise: generating a third encrypted data stream, generating a third hash code corresponding to the third encrypted data stream, wherein the decryption key corresponding to the first encrypted data stream comprises a combination of the key associated with the first network device, the second hash code, and the third hash code, sending, via the network to the group of network devices comprising the first network device, the second network device, and a third network device, the first encrypted data stream, the second encrypted data stream, the third encrypted data stream, the first hash code, the second hash code, and the third hash code, wherein the first network device deletes the second encrypted data stream after the first network device hashes the second encrypted data stream and the first network device deletes the third encrypted data stream after the first network device hashes hashing the third encrypted data stream, and in response to the second network device being determined not to have received the second hash code from the first network device within the defined threshold time, or the third network device being determined not to have received the third hash code from the first network device within the defined threshold time, determining that the first network device is unauthorized to use the network.

In another embodiment, a non-transitory machine-readable medium can comprise executable instructions that, when executed by a processor, facilitate performance of operations, comprising: generating first encrypted data associated with first information and second encrypted data associated with second information, generating a first hash code corresponding to the first encrypted data and a second hash code corresponding to the second encrypted data, wherein a decryption key corresponding to the first encrypted data comprises a combination of a key associated with first network equipment and the second hash code, sending, via a network to a group of network equipment comprising the first network equipment and second network equipment, the first encrypted data, the second encrypted data, the first hash code, and the second hash code, wherein the first network equipment deletes the second encrypted data after the first network equipment hashes the second encrypted data, and in response to the second network equipment being determined not to have received the second hash code within a defined threshold time, determining that the first network equipment is unauthorized to use the network.

In various embodiments, the above operations can further comprise: in response to the first network equipment being determined to be unauthorized to use the network, generating alarm information representative of an alarm indicative of the determining that the first network equipment is unauthorized to use the network.

In one or more embodiments, the key associated with a first network equipment can comprise a unique key associated with the first network equipment. It is noted that the first network equipment can comprise a first network terminal and the second network equipment can comprise a second network terminal.

In some embodiments, the above operations can further comprise: generating third encrypted data, generating a third hash code corresponding to the third encrypted data, wherein the decryption key corresponding to the first encrypted data comprises a combination of the key associated with the first network equipment, the second hash code, and the third hash code, sending, via the network to the group of network equipment comprising the first network equipment, the second network equipment, and third network equipment, the first encrypted data, the second encrypted data, the third encrypted data, the first hash code, the second hash code, and the third hash code, wherein the first network equipment deletes the second encrypted data after the first network device hashes the second encrypted data and the first network equipment deletes the third encrypted data after the first network equipment hashes hashing the third encrypted data, and in response to the second network equipment being determined not to have received the second hash code within the defined threshold time, or the third network equipment being determined not to have received the third hash code within the defined threshold time, determining that the first network equipment is unauthorized to use the network.

It is noted that the first network equipment can be determined to be unauthorized to use the network in response to the second network equipment being determined not to have received the second hash code from the first network equipment within the defined threshold time or the third network equipment being determined not to have received the third hash code from the first network equipment within the defined threshold time.

According to yet another embodiment, a method can comprise: generating, by network equipment comprising a processor, a first encrypted data stream associated with first information and a second encrypted data stream associated with second information, generating, by the network equipment, a first hash code corresponding to the first encrypted data stream and a second hash code corresponding to the second encrypted data stream, wherein a decryption key corresponding to the first encrypted data stream comprises a combination of a key associated with a first network device and the second hash code, sending, by the network equipment via a network to a group of network devices comprising the first network device and a second network device, the first encrypted data stream, the second encrypted data stream, the first hash code, and the second hash code, wherein the first network device deletes the second encrypted data stream after the first network device hashes the second encrypted data stream, and in response to the second network device being determined not to have received the second hash code within a defined threshold time, determining, by the network equipment, that the first network device is unauthorized to use the network.

In one or more embodiments, the network equipment comprises an optical line terminal. It is noted that the first network device can comprise a first optical network terminal and the second network device can comprise a second optical network terminal. It is additionally noted that the network can comprise a fiber optic network, and the first network device can send the second hash code to the second network device via a wireless radio access network.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to passive optical network security. The system 102 can comprise one or more of a variety of components, such as memory 104, processor 106, bus 108, encryption component 110, hash component 112, communication component 114, and/or authorization determination component 116. In various embodiments, the system 102 can comprise an optical line terminal (e.g., such as optical line terminal 402).

In various embodiments, one or more of the memory 104, processor 106, bus 108, encryption component 110, hash component 112, communication component 114, and/or authorization determination component 116 can be communicatively or operably coupled (e.g., over a bus or wireless network) to one another to perform one or more functions of the system 102.

According to an embodiment, the encryption component 110 can generate a first encrypted data stream (e.g., T-1) associated with first information (e.g., data traffic) and a second encrypted data stream (e.g., T-2) associated with second information. In additional embodiment, the encryption component 110 can generate a third encrypted data stream (e.g., T-3) (e.g., associated with third information). In this regard, the encryption component 110 can generate a plurality of encrypted data streams associated with respective information or data. For example, a router (e.g., a passive router, such as router 404) can couple an optical line terminal (e.g., optical line terminal 402) to a plurality of optical network terminals (e.g., optical network terminal 406, optical network terminal 408, optical network terminal 410, or other suitable optical network terminals). In some embodiments, the router 404 can be located at a street, and the optical network terminals can be located at each home on said street. In this regard, such encrypted data or encrypted data streams generated by the encryption component 110 can comprise network traffic for each respective home (e.g., via each respective optical network terminal).

According to an embodiment, the hash component 112 can generate a first hash code corresponding to the first encrypted data stream (e.g., T-1) and a second hash code corresponding to the second encrypted data stream (e.g., T-2). In this regard, a decryption key corresponding to the first encrypted data stream can comprise a combination of a key associated with a first network device (e.g., optical network terminal 406) and the second hash code. Further in this regard, the key associated with a first network device (e.g., optical network terminal 406) can comprise a unique key associated with the first network device. Likewise, keys associated with other network devices (e.g., optical network terminal 408, optical network terminal 410, other suitable network devices) can comprise a unique keys associated with those respective network devices.

In additional embodiments, the hash component 112 can generate a third hash code corresponding to the third encrypted data stream (e.g., T-3). In this regard, the decryption key corresponding to the first encrypted data stream can comprise a combination of the key associated with the first network device, the second hash code, and the third hash code. It is noted that the foregoing quantities of streams and hash codes are exemplary, and that embodiments herein are not limited to two or three hash codes. For example, if a street comprises twenty network devices, twenty respective hash codes can be utilized (e.g., in combination with a key herein).

According to an embodiment, the communication component 114 can send (e.g., via a network such as a fiber optic network comprising fiber optic line 412) to a group of network devices comprising the first network device (e.g., optical network terminal 406) and a second network device (e.g., optical network terminal 408), the first encrypted data stream (e.g., T-1), the second encrypted data stream (e.g., T-2), the first hash code, and the second hash code. In this regard, the first network device can be configured to delete the second encrypted data stream after the first network device hashes the second encrypted data stream.

In additional embodiments, the communication component 114 can send, via the network to the group of network devices comprising the first network device (e.g., optical network terminal 406), the second network device (e.g., optical network terminal 408), and the third network device (e.g., optical network terminal 410), the first encrypted data stream (e.g., T-1), the second encrypted data stream (e.g., T-2), the third encrypted data stream (e.g., T-3), the first hash code, the second hash code, and the third hash code. In this regard, the first network device can be configured to delete the second encrypted data stream after the first network device hashes the second encrypted data stream and can be configured to delete the third encrypted data stream after the first network device hashes hashing the third encrypted data stream.

According to an embodiment, the system 102 (e.g., communication component 114) can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the authorization determination component 116 can, in response to the second network device being determined not to have received the second hash code within a defined threshold time, determine that the first network device is unauthorized to use the network. It is noted that in some embodiments, the authorization determination component 116 can determine that the first network device is unauthorized to use the network in response to the second network device being determined (e.g., by the authorization determination component 116) not to have received the second hash code (e.g., via the communication component 114) from the first network device within the defined threshold time. In further embodiments, the authorization determination component 116 can determine that the first network device is unauthorized to use the network in response to the second network device being determined (e.g., by the authorization determination component 116) not to have received the second hash code (e.g., via the communication component 114) from the system 102 within the defined threshold time. Additionally, the authorization determination component 116 can, in response to the second network device being determined not to have received the second hash code from the first network device within the defined threshold time, or the third network device being determined not to have received the third hash code from the first network device within the defined threshold time, determine that the first network device is unauthorized to use the network. It is noted that such defined threshold times can be short (e.g., in milliseconds).

In various embodiments herein, the aforementioned network can comprise a first network, and the first network device can send the second hash code to the second network device via a second network, different from the first network. In this regard, the first network can comprise a fiber optic network. In various embodiments, the second network can comprise another fiber optic network, different from the first network, or a wireless radio frequency network (e.g., a 3G, 4G, 5G, or 6G radio access network, Wi-Fi network, Bluetooth, NFC, or another suitable network).

Figure 2:
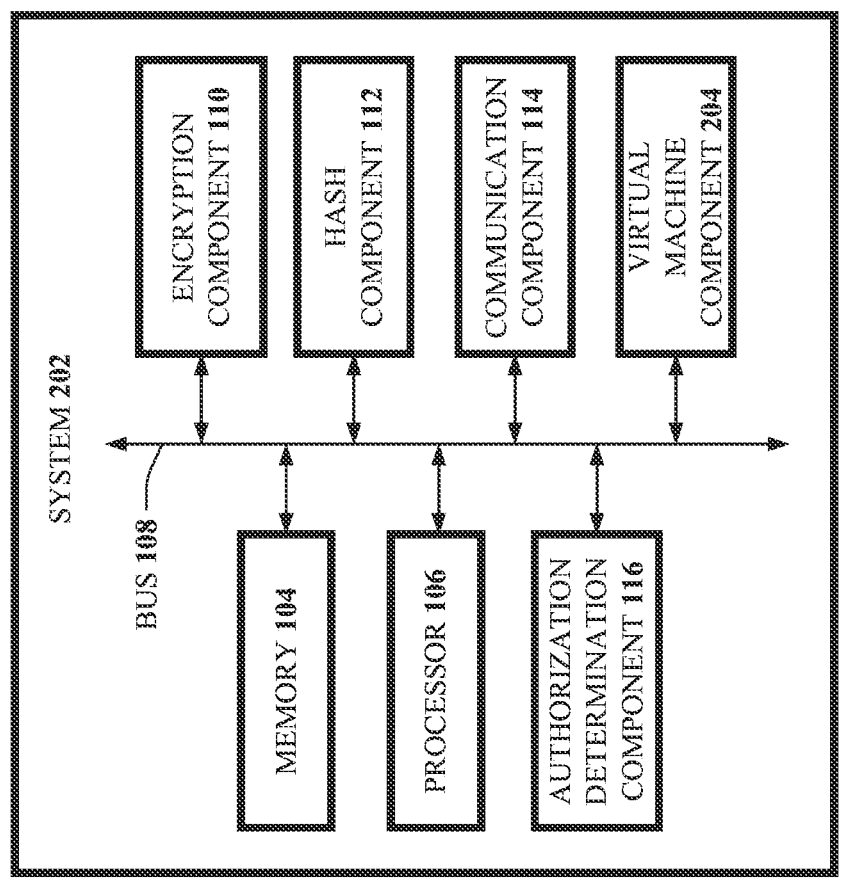
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to passive optical network security. The system 202 can be similar to system 102, and can comprise one or more of a variety of components, such as memory 104, processor 106, bus 108, encryption component 110, hash component 112, communication component 114, and/or authorization determination component 116. The system 202 can additionally comprise a virtual machine component 204.

In various embodiments, one or more of the memory 104, processor 106, bus 108, encryption component 110, hash component 112, communication component 114, and/or authorization determination component 116, and/or virtual machine component 204 can be communicatively or operably coupled (e.g., over a bus or wireless network) to one another to perform one or more functions of the system 202.

According to an embodiment, the virtual machine component 204 can generate and/or send encrypted data streams (e.g., via secure optical server (SOS) 414) comprising the first encrypted data stream (e.g., T-1) and the second encrypted data stream (e.g., T-2) (and/or additional encrypted data or data streams herein). In this regard, a group of network devices can comprise respective virtual machines (e.g., via secure optical client (SOC) 416) that can generate and send encrypted hash codes based on encrypted data streams comprising the first encrypted data stream and the second encrypted data stream (and/or additional encrypted data or data streams herein). It is noted that the SOS 414 and/or SOC 416 can comprise respective tamperproof, secure applications enabled, for instance, via respective virtual machines running on respective devices or equipment.

Figure 3:
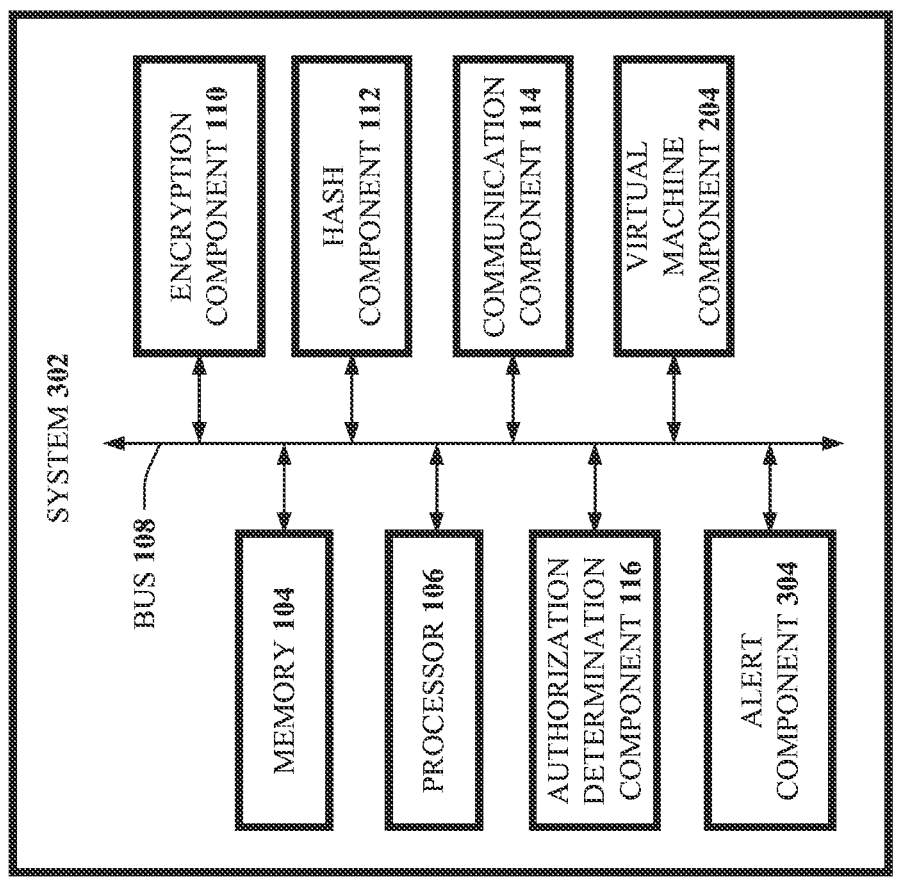
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to passive optical network security. The system 302 can be similar to system 202, and can comprise one or more of a variety of components, such as memory 104, processor 106, bus 108, encryption component 110, hash component 112, communication component 114, authorization determination component 116, and/or virtual machine component 204. The system 302 can additionally comprise an alert component 304.

In various embodiments, one or more of the memory 104, processor 106, bus 108, encryption component 110, hash component 112, communication component 114, authorization determination component 116, virtual machine component 204, and/or alert component 304 can be communicatively or operably coupled (e.g., over a bus or wireless network) to one another to perform one or more functions of the system 302.

According to an embodiment, the alert component 304 can in response to the first network equipment being determined to be unauthorized to use the network, generate alarm information representative of an alarm indicative of the determining that the first network equipment is unauthorized to use the network. Such an alarm can comprise, for instance, a message displayed via a graphical user interface (GUI) using a respective SOS 414 and/or SOC 416. Such an alarm can additionally/alternatively comprise an audible alert broadcast via a speaker of a respective optical line terminal 402, optical network terminal 406, optical network terminal 408, and/or optical network terminal 410. Further, the system 302 can (e.g., via the communication component 114) transmit a message representative of the alarm information to a communicatively coupled device (e.g., a mobile device or computer registered with the system 302).

Figure 4:
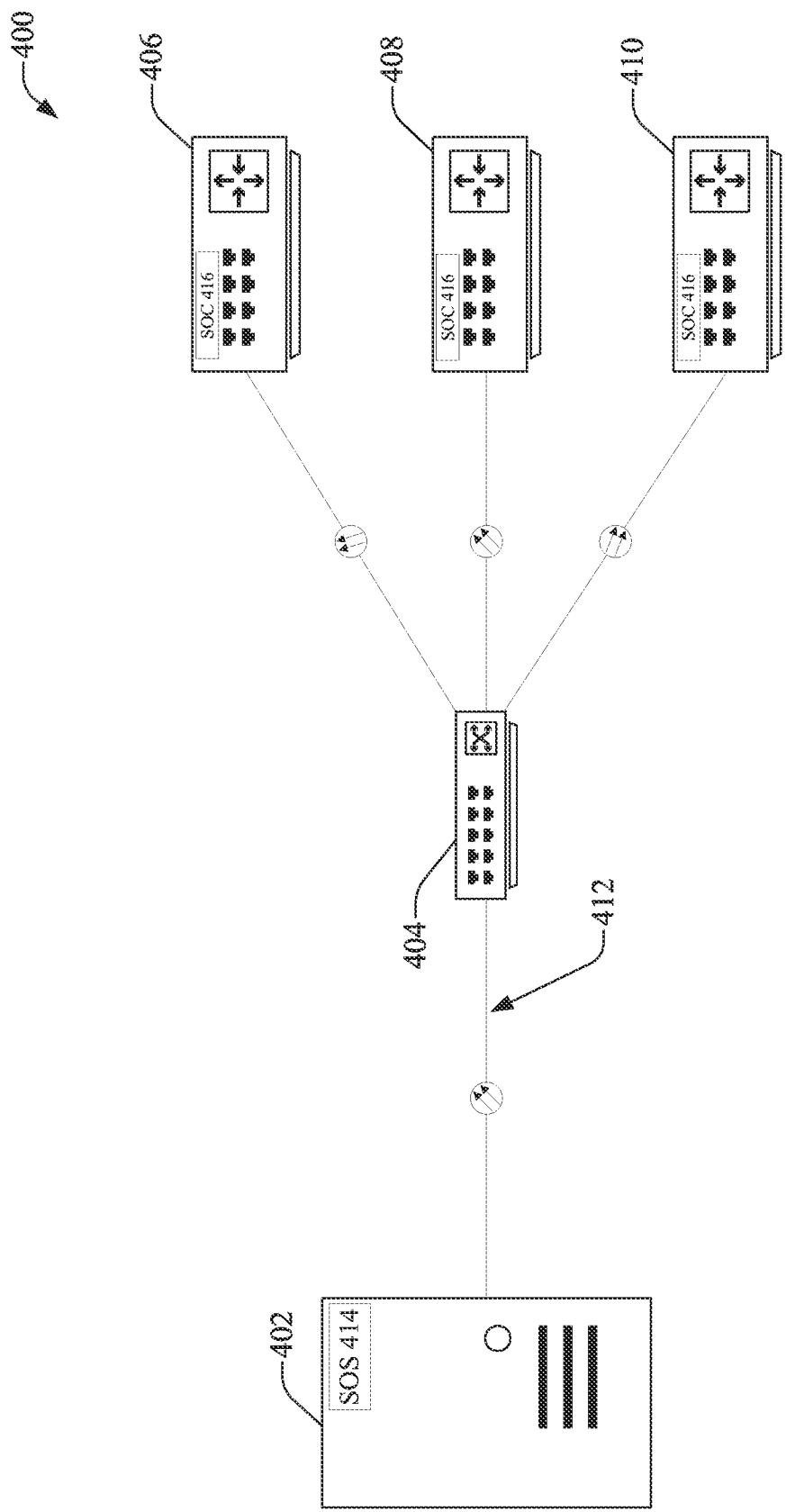
FIG. 4 is a block diagram of an exemplary system topology in accordance with one or more embodiments described herein.

With reference to FIG. 4, there is illustrated a block diagram of an exemplary system topology 400 in accordance with one or more embodiments described herein. In this regard, a line terminal (e.g., optical line terminal 402) can be communicatively coupled to a router (e.g., a passive router such as router 404) via a communication line (e.g., a fiber optic line 412, cable line, ethernet line, or another suitable line or wireless network) to various network terminals (e.g., optical network terminal 406, optical network terminal 408, optical network terminal 410, or other suitable network terminals). According to an embodiment, the optical line terminal 402 can send (e.g., via SOS 414) various traffic streams (e.g., a first traffic stream T-1, a second traffic stream T-2, a third traffic stream T-3, and so on) to respective optical network terminals (e.g., optical network terminal 406 comprising SOC 416, optical network terminal 408 comprising SOC 416, and optical network terminal 410 comprising SOC 416). In this regard, T-1 can be intended for optical network terminal 406, T-2 can be intended for optical network terminal 408, and T-3 can be intended for optical network terminal 410. It is noted that SOS 414 and/or SOC 416 can comprise respective virtual machines, which can be in continuous communication with one another (e.g., over a dedicated fiber strand on the fiber optic line 412, a separate fiber line other than the fiber optic line 412, and/or a separate wireless radio access network).

Exemplary encryption (e.g., via SOS 414) can be executed as follows. Each network traffic stream (e.g., T-1, T-2, T-3, etc.) can be respectively hashed (e.g., which can comprise a configurable block, such as a 64 k or 128 k block). To encrypt T-1, for instance, T-2 and T-3 can be respectively hashed along with a unique code or key associated with the optical network terminal 406. To encrypt T-2, for instance, T-1 and T-3 can be respectively hashed along with a unique code or key associated with the optical network terminal 408. To encrypt T-3, for instance, T-1 and T-2 can be respectively hashed along with a unique code or key associated with the optical network terminal 410.

Exemplary decryption (e.g., via SOC 416) can be executed as follows. To decrypt T-1 traffic, for instance (e.g., as intended for optical network terminal 406), the SOC 416 of optical network terminal 406 can hash each of received traffic streams T-2 and T-3 (e.g., hash 2 and hash 3). The SOC 416 of the optical network terminal 406 can then erase T-2 and T-3 (e.g., via the SOC 416) such that when respective traffic is subjected to a hash function, the associated bits of the respective traffic are discarded. In this regard, the decryption key for T-1 can comprise [(hash 2+hash 3)+(a unique key associated with the optical network terminal 406)]. The foregoing ensures, for instance, that other traffic streams (e.g., T-2 and T-3) are discarded as a product of decrypting network traffic T-1. The optical network terminal 406 can then provide hash 2 and hash 3 (e.g., to the optical line terminal 402 and/or to the optical network terminal 408 and optical network terminal 410) to announce a successful disposal of the two network traffic streams T-2 and T-3. If, for example, the optical line terminal 402, or the optical network terminal 408 or optical network terminal 410, do not receive hash 2 or hash 3 within a defined threshold time (e.g., in milliseconds) from the optical network terminal 406, then the optical network terminal 406 can be determined to be unauthorized (e.g., via the authorization determination component 116) to use a system herein, and a signal corresponding to the determination that the optical network terminal 406 is unauthorized to the SOS 414 and/or SOC's 416 can be transmitted (e.g., via a dedicated fiber strand on the fiber optic line 412, a fiber line separate from the fiber optic line 412, or via a wireless radio access network). It is noted that hashes used for validation (e.g., for encryption herein) can be discarded after successful validation.

In various embodiments, a blockchain can be utilized such that transactions or interactions between the optical line terminal 402 and optical network terminal 406, optical network terminal 408, and/or optical network terminal 410 are blockchained together. The foregoing can enable a SOS 414 and/or SOC 416 herein to have deeper insights into which devices performed decryption, encryption, hashing, and other aspects of optical network security herein.

It is noted that each of the optical line terminal 402, optical network terminal 406, optical network terminal 408, and/or optical network terminal 410 can possess the hardware required to implement a variety of communication protocols (e.g., IR, shortwave transmission, NFC, Bluetooth, Wi-Fi, LTE, 3G, 4G, 5G, 6G, GSM, CDMA, satellite, visual cues, radio waves, etc.)

Figure 5:
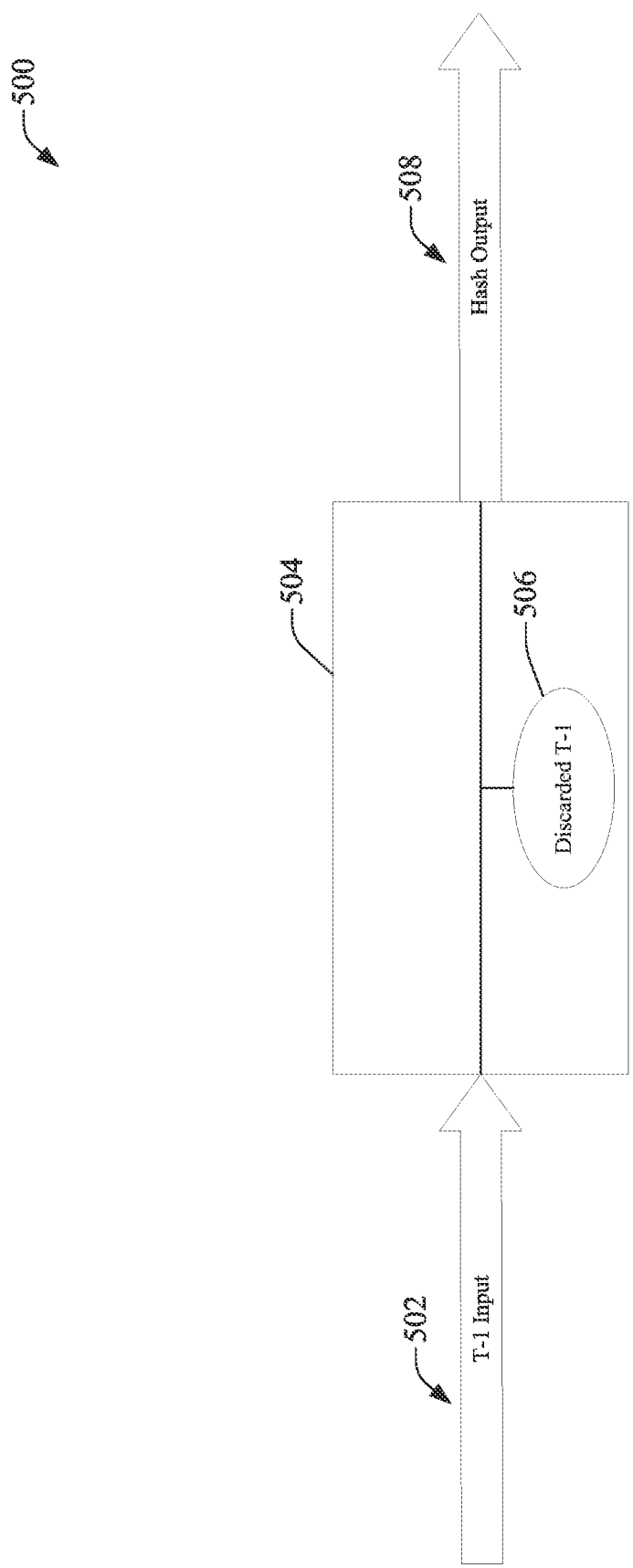
FIG. 5 is a block diagram of an exemplary system topology in accordance with one or more embodiments described herein.

With reference to FIG. 5, there is illustrated a block diagram of an exemplary system topology 500 in accordance with one or more embodiments described herein. In this regard, non-repudiation is enabled. Further in this regard, traffic 1 (e.g., T-1 input 502) can be provided to a system 504 (e.g., which can be similar to a system 102, system 202, system 302, or another suitable system). It is noted that a single input/single output function can be utilized for data traffic transmission herein. If any portion of a system herein is determined to be modified, a corresponding alarm can be generated (e.g., via alert component 304). For example, in order to obtain a hash output 508, the T-1 input 502 must be discarded into discarded T-1 506.

Figure 6:
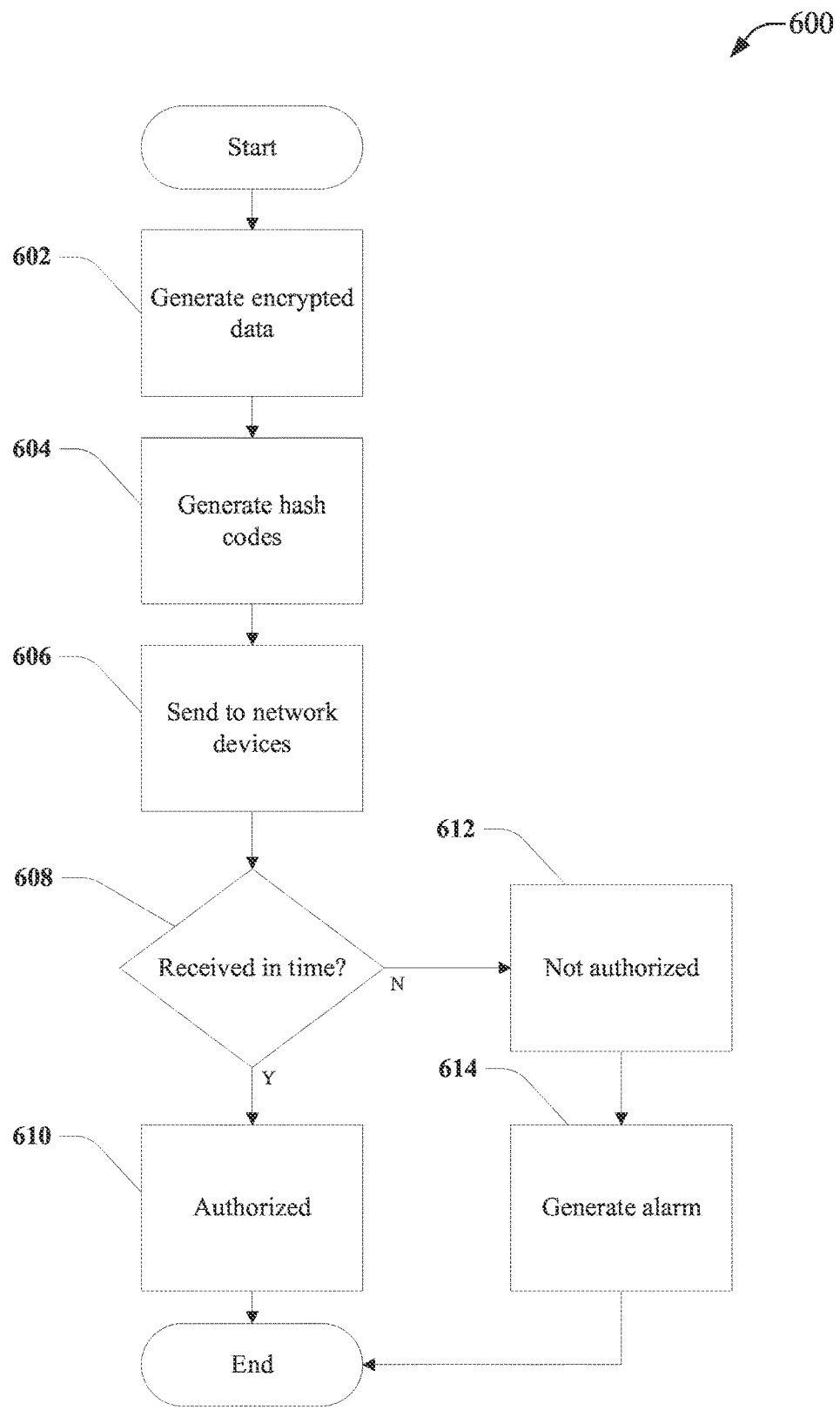
FIG. 6 is a flowchart for a process associated with passive optical network security in accordance with one or more embodiments described herein.

Turning now to FIG. 6, there is illustrated a flow chart of a process 600 relating to passive optical network security in accordance with one or more embodiments described herein. At 602, the process 600 can comprise generating encrypted data streams associated with respective information (e.g., using the encryption component 110). At 604, the process 600 can comprise generating (e.g., using the hash component 112) hash codes corresponding to respective encrypted data streams generated at 600. Respective decryption keys can correspond to combinations of a key and respective hash codes. For example, a decryption key corresponding to a first encrypted data stream can comprise a combination of a key associated with a first network equipment and a hash code of one or more network equipment other than the first network equipment. At 606, the process 600 can comprise sending (e.g., using the communication component 114) to a group of network equipment, various respective encrypted data streams and hash codes. It is noted that network equipment can delete an encrypted data stream of another network equipment after the network equipment hashes the encrypted data stream. At 608, the process 600 can comprise determining (e.g., using the authorization determination component 116) whether a network device received a corresponding hash code within a defined threshold time. If at 608, the corresponding hash code is received within the defined threshold time, the process can proceed to 610 at which a corresponding network device is designated authorized to use a network herein. If at 608, the corresponding hash code is not received within the defined threshold time, the process can proceed to 612 at which a corresponding network equipment is designated unauthorized to use a network herein. At 614, the process 600 can comprise generating (e.g., using the alert component 304) an alarm indicative of the network equipment being determined to be unauthorized to use the network.

Figure 7:
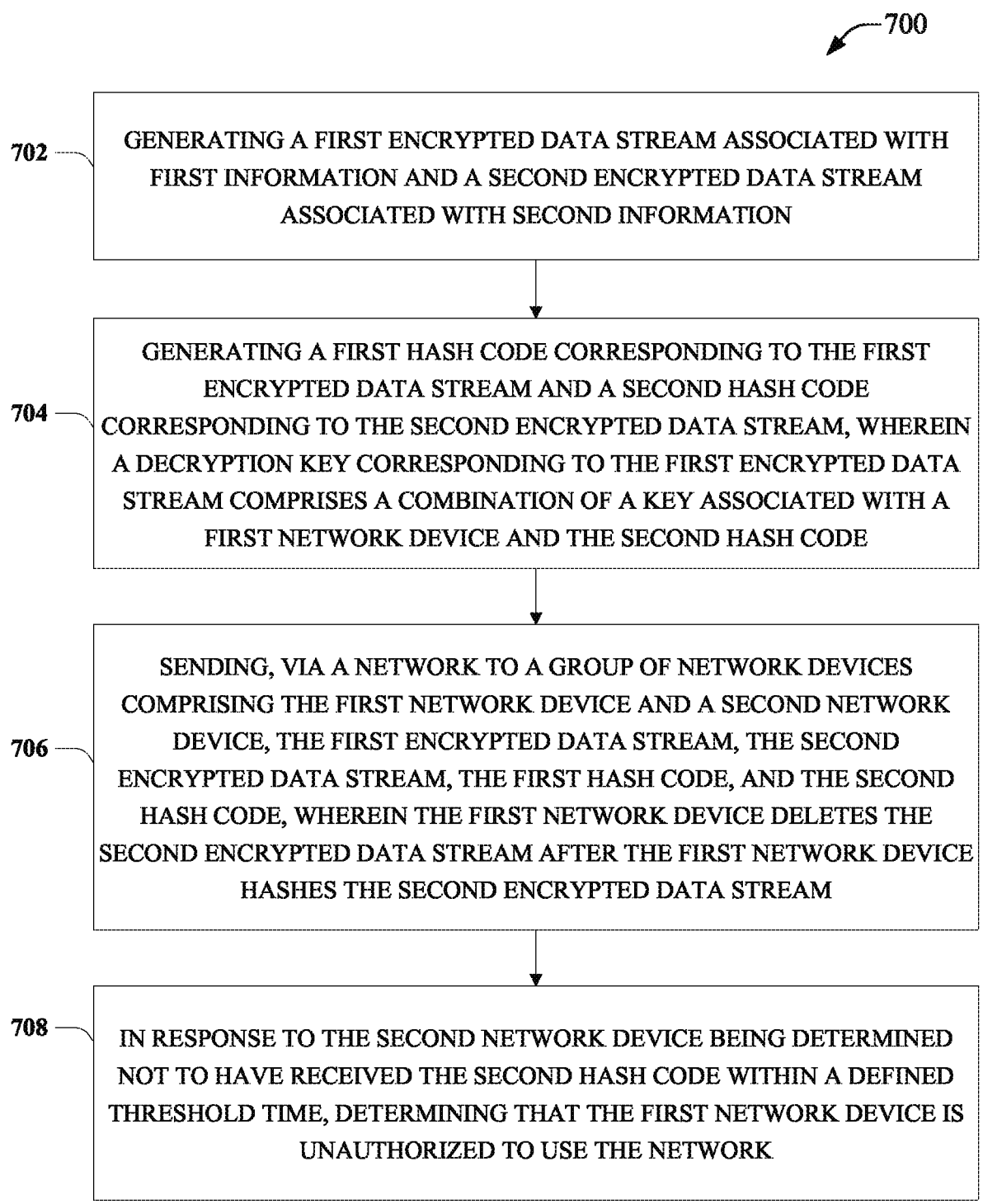
FIG. 7 is a block flow diagram for a process associated with passive optical network security in accordance with one or more embodiments described herein.

FIG. 7 illustrates a block flow diagram for a process 700 associated with passive optical network security in accordance with one or more embodiments described herein. At 702, the process 700 can comprise generating (e.g., using an encryption component 110) a first encrypted data stream (e.g., T-1) associated with first information and a second encrypted data stream (e.g., T-2) associated with second information. At 704, the process 700 can comprise generating (e.g., using a hash component 112) a first hash code corresponding to the first encrypted data stream and a second hash code corresponding to the second encrypted data stream, wherein a decryption key corresponding to the first encrypted data stream comprises a combination of a key associated with a first network device and the second hash code. At 706, the process 700 can comprise sending (e.g., using a communication component 114), via a network to a group of network devices comprising the first network device (e.g., optical network terminal 406) and a second network device (e.g., optical network terminal 408), the first encrypted data stream, the second encrypted data stream, the first hash code, and the second hash code, wherein the first network device deletes the second encrypted data stream after the first network device hashes the second encrypted data stream. At 708, the process 700 can comprise in response to the second network device being determined (e.g., using the authorization determination component 116) not to have received the second hash code within a defined threshold time, determining (e.g., using the authorization determination component 116) that the first network device is unauthorized to use the network.

Figure 8:
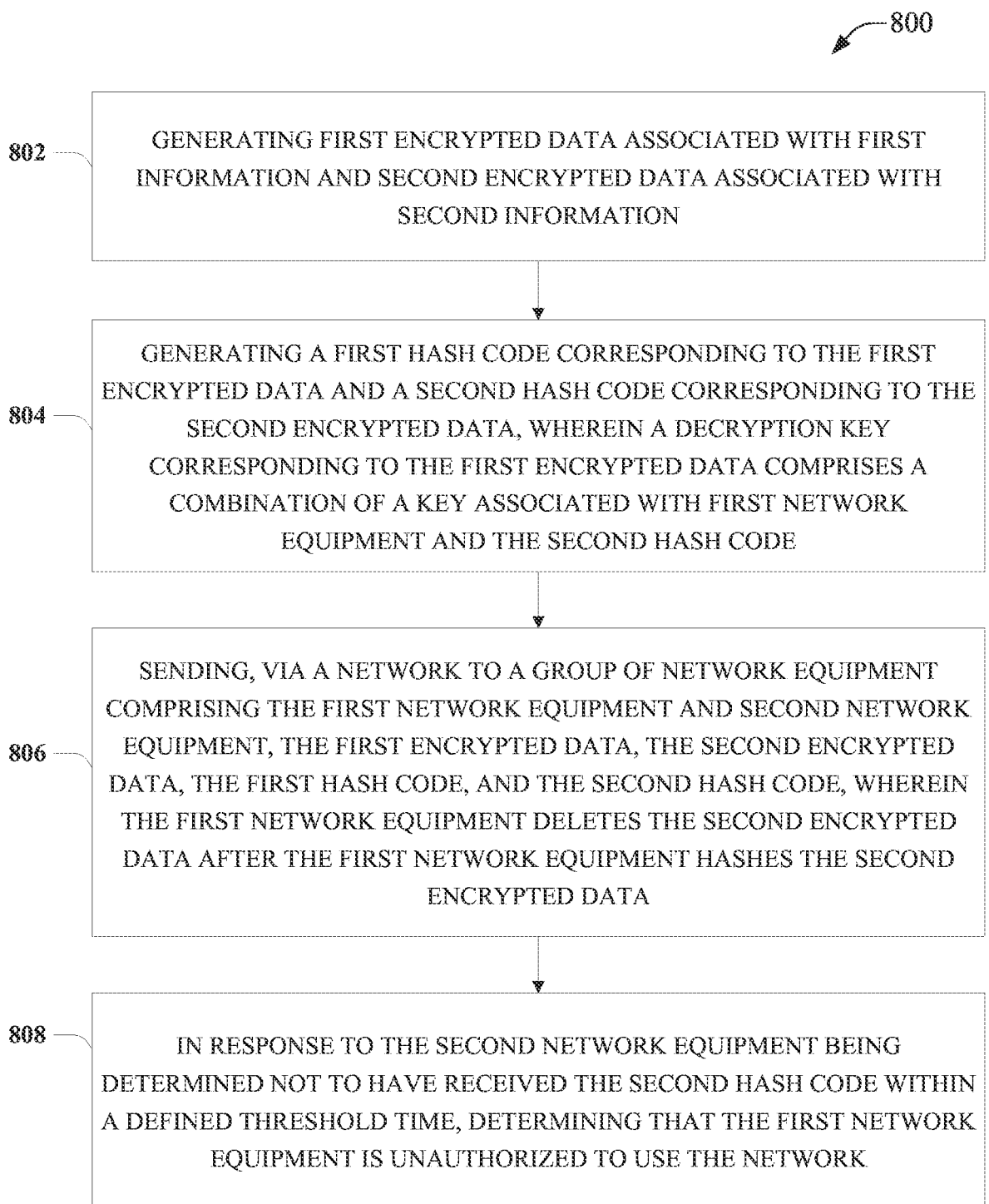
FIG. 8 is a block flow diagram for a process associated with passive optical network security in accordance with one or more embodiments described herein.

FIG. 8 illustrates a block flow diagram for a process 800 associated with passive optical network security in accordance with one or more embodiments described herein. At 802, the process 800 can comprise generating (e.g., using an encryption component 110) first encrypted data (e.g., T-1) associated with first information and second encrypted data (e.g., T-2) associated with second information. At 804, the process 800 can comprise generating (e.g., using a hash component 112) a first hash code corresponding to the first encrypted data and a second hash code corresponding to the second encrypted data, wherein a decryption key corresponding to the first encrypted data comprises a combination of a key associated with first network equipment and the second hash code. At 806, the process 800 can comprise sending (e.g., using a communication component 114), via a network to a group of network equipment comprising the first network equipment (e.g., optical network terminal 406) and second network equipment (e.g., optical network terminal 408), the first encrypted data, the second encrypted data, the first hash code, and the second hash code, wherein the first network equipment deletes the second encrypted data after the first network equipment hashes the second encrypted data. At 808, the process 800 can comprise in response to the second network equipment being determined (e.g., using the authorization determination component 116) not to have received the second hash code within a defined threshold time, determining (e.g., using the authorization determination component 116) that the first network equipment is unauthorized to use the network.

Figure 9:
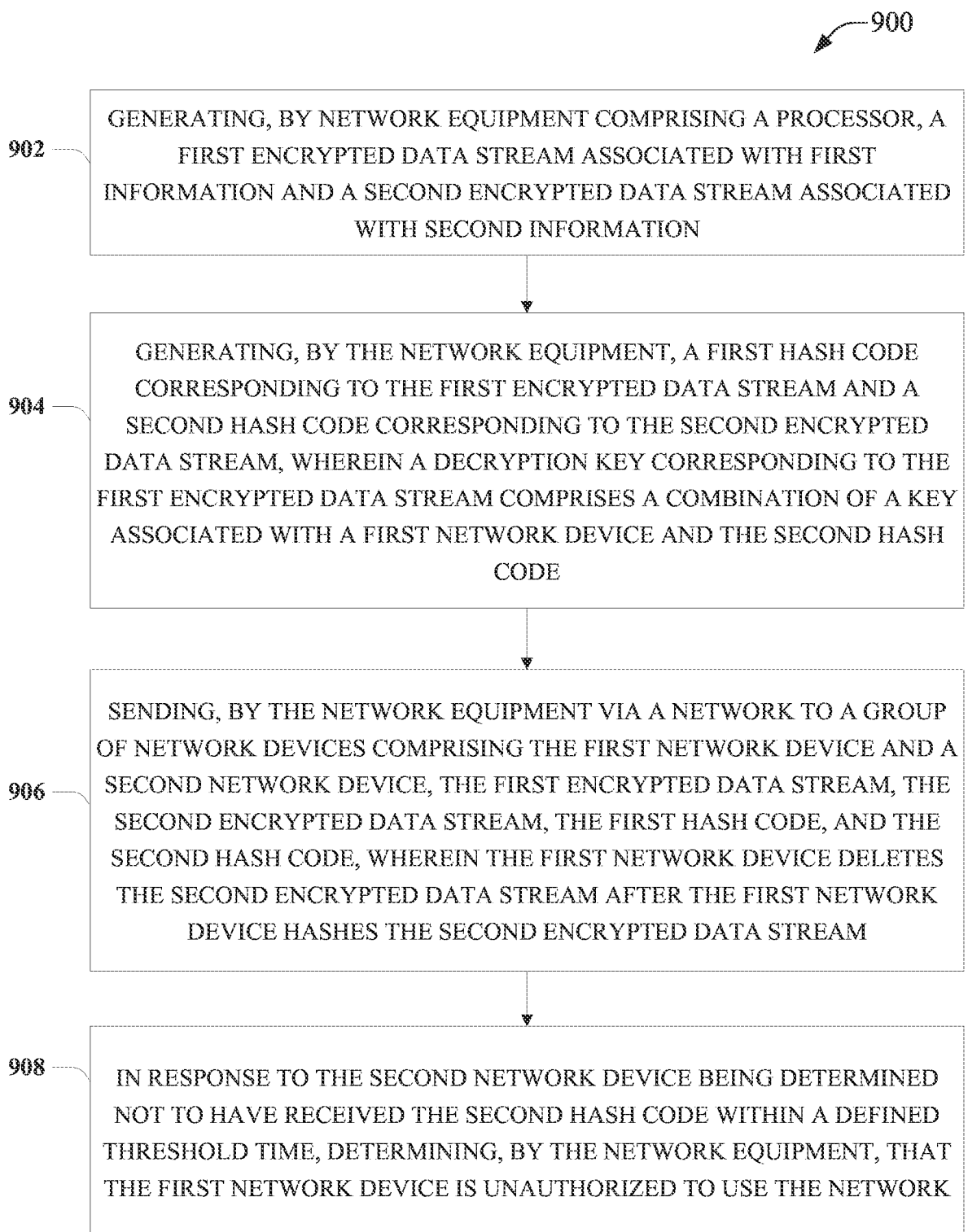
FIG. 9 is a block flow diagram for a process associated with passive optical network security in accordance with one or more embodiments described herein.

FIG. 9 illustrates a block flow diagram for a process 900 associated with passive optical network security in accordance with one or more embodiments described herein. At 902, the process 900 can comprise generating (e.g., using an encryption component 110), by network equipment comprising a processor (e.g., optical line terminal 402), a first encrypted data stream (e.g., T-1) associated with first information and a second encrypted data stream (e.g., T-2) associated with second information. At 904, the process 900 can comprise generating (e.g., using a hash component 112), by the network equipment, a first hash code corresponding to the first encrypted data stream and a second hash code corresponding to the second encrypted data stream, wherein a decryption key corresponding to the first encrypted data stream comprises a combination of a key associated with a first network device and the second hash code. At 906, the process 900 can comprise sending (e.g., using a communication component 114), by the network equipment via a network to a group of network devices comprising the first network device (e.g., optical network terminal 406) and a second network device (e.g., optical network terminal 408), the first encrypted data stream, the second encrypted data stream, the first hash code, and the second hash code, wherein the first network device deletes the second encrypted data stream after the first network device hashes the second encrypted data stream. At 908, the process 800 can comprise in response to the second network device being determined (e.g., using the authorization determination component 116) not to have received the second hash code within a defined threshold time, determining (e.g., using the authorization determination component 116), by the network equipment, that the first network device is unauthorized to use the network.

Figure 10:
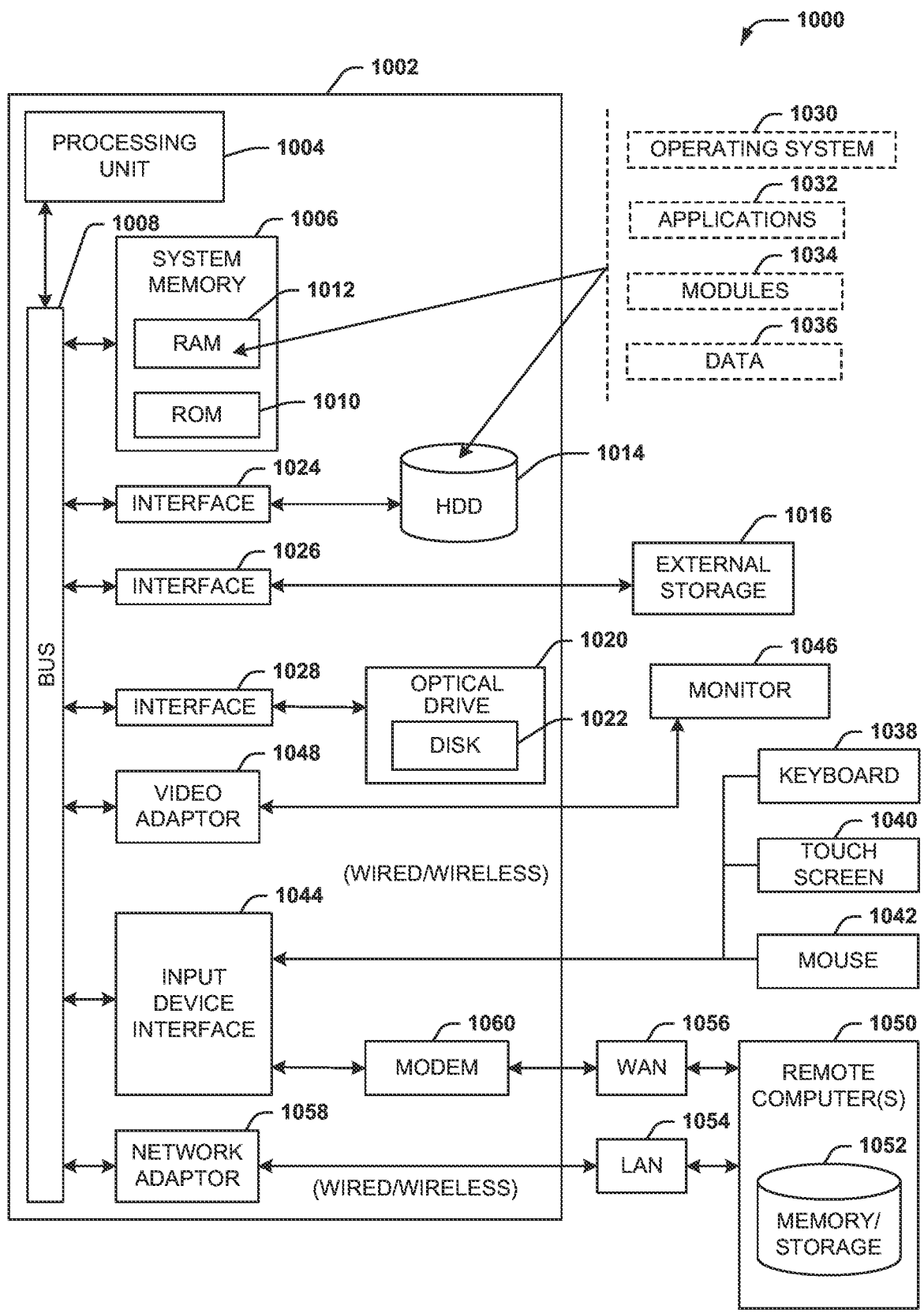
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
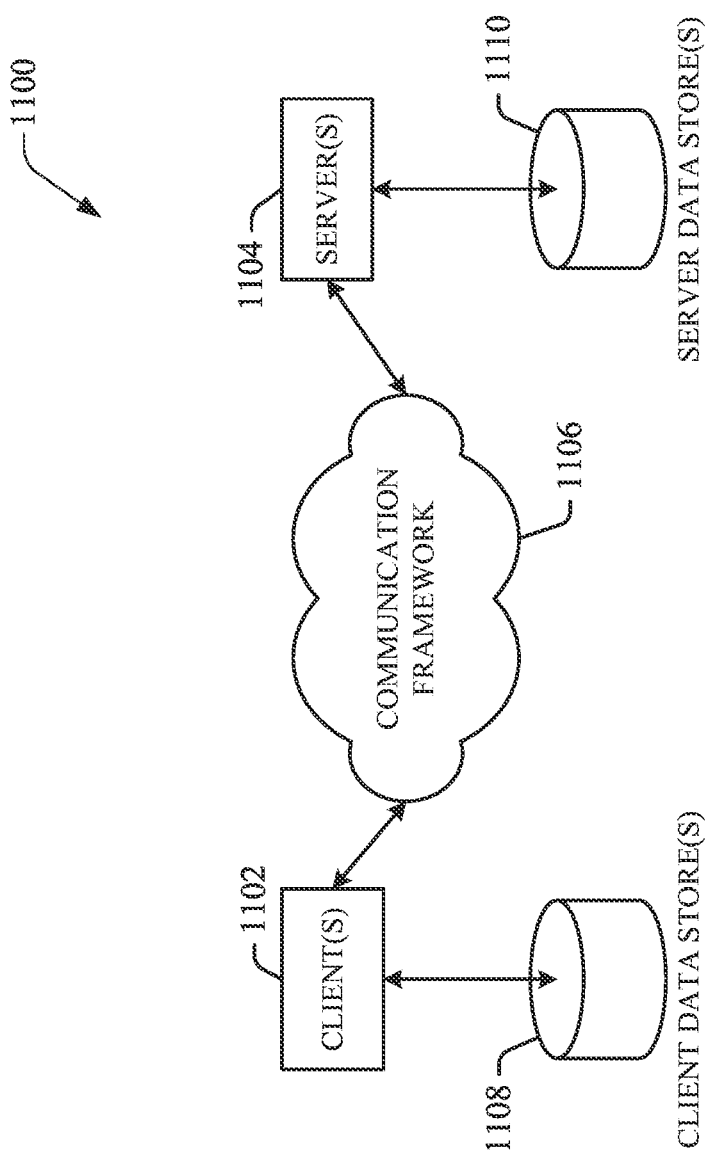
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is noted that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
generating a first encrypted data stream associated with first information and a second encrypted data stream associated with second information;
generating a first hash code corresponding to the first encrypted data stream and a second hash code corresponding to the second encrypted data stream, wherein a decryption key corresponding to the first encrypted data stream comprises a combination of a key associated with a first network device and the second hash code;
sending, via a network to a group of network devices comprising the first network device and a second network device, the first encrypted data stream, the second encrypted data stream, the first hash code, and the second hash code, wherein the first network device deletes the second encrypted data stream after the first network device hashes the second encrypted data stream; and
in response to the second network device being determined not to have received the second hash code within a defined threshold time, determining that the first network device is unauthorized to use the network.

2. The system of claim 1, wherein the first network device is determined to be unauthorized to use the network in response to the second network device being determined not to have received the second hash code from the first network device within the defined threshold time.

3. The system of claim 1, wherein the first network device is determined to be unauthorized to use the network in response to the second network device being determined not to have received the second hash code from the system within the defined threshold time.

4. The system of claim 1, wherein the network is a first network, and wherein the first network device sends the second hash code to the second network device via a second network, different from the first network.

5. The system of claim 4, wherein the first network comprises a fiber optic network.

6. The system of claim 5, wherein the second network comprises a fiber optic network.

7. The system of claim 5, wherein the second network comprises a wireless radio frequency network.

8. The system of claim 1, wherein the system further comprises a virtual machine that generates and sends encrypted data streams comprising the first encrypted data stream and the second encrypted data stream.

9. The system of claim 1, wherein the group of network devices comprises respective virtual machines that generate and send encrypted hash codes based on encrypted data streams comprising the first encrypted data stream and the second encrypted data stream.

10. The system of claim 1, wherein the operations further comprise:
generating a third encrypted data stream;
generating a third hash code corresponding to the third encrypted data stream, wherein the decryption key corresponding to the first encrypted data stream comprises a combination of the key associated with the first network device, the second hash code, and the third hash code;
sending, via the network to the group of network devices comprising the first network device, the second network device, and a third network device, the first encrypted data stream, the second encrypted data stream, the third encrypted data stream, the first hash code, the second hash code, and the third hash code, wherein the first network device deletes the second encrypted data stream after the first network device hashes the second encrypted data stream and the first network device deletes the third encrypted data stream after the first network device hashes hashing the third encrypted data stream; and
in response to the second network device being determined not to have received the second hash code from the first network device within the defined threshold time, or the third network device being determined not to have received the third hash code from the first network device within the defined threshold time, determining that the first network device is unauthorized to use the network.

11. A non-transitory machine-readable medium, comprising executable instructions that, when executed by a processor, facilitate performance of operations, comprising:
generating first encrypted data associated with first information and second encrypted data associated with second information;
generating a first hash code corresponding to the first encrypted data and a second hash code corresponding to the second encrypted data, wherein a decryption key corresponding to the first encrypted data comprises a combination of a key associated with first network equipment and the second hash code;
sending, via a network to a group of network equipment comprising the first network equipment and second network equipment, the first encrypted data, the second encrypted data, the first hash code, and the second hash code, wherein the first network equipment deletes the second encrypted data after the first network equipment hashes the second encrypted data; and
in response to the second network equipment being determined not to have received the second hash code within a defined threshold time, determining that the first network equipment is unauthorized to use the network.

12. The non-transitory machine-readable medium of claim 11, wherein the operations further comprise:
in response to the first network equipment being determined to be unauthorized to use the network, generating alarm information representative of an alarm indicative of the determining that the first network equipment is unauthorized to use the network.

13. The non-transitory machine-readable medium of claim 11, wherein the key associated with a first network equipment comprises a unique key associated with the first network equipment.

14. The non-transitory machine-readable medium of claim 11, wherein the first network equipment comprises a first network terminal and the second network equipment comprises a second network terminal.

15. The non-transitory machine-readable medium of claim 11, wherein the operations further comprise:
generating third encrypted data;

generating a third hash code corresponding to the third encrypted data, wherein the decryption key corresponding to the first encrypted data comprises a combination of the key associated with the first network equipment, the second hash code, and the third hash code;

sending, via the network to the group of network equipment comprising the first network equipment, the second network equipment, and third network equipment, the first encrypted data, the second encrypted data, the third encrypted data, the first hash code, the second hash code, and the third hash code, wherein the first network equipment deletes the second encrypted data after the first network device hashes the second encrypted data and the first network equipment deletes the third encrypted data after the first network equipment hashes hashing the third encrypted data; and in response to the second network equipment being determined not to have received the second hash code within the defined threshold time, or the third network equipment being determined not to have received the third hash code within the defined threshold time, determining that the first network equipment is unauthorized to use the network.

16. The non-transitory machine-readable medium of claim 15, wherein the first network equipment is determined to be unauthorized to use the network in response to the second network equipment being determined not to have received the second hash code from the first network equipment within the defined threshold time or the third network equipment being determined not to have received the third hash code from the first network equipment within the defined threshold time.

17. A method, comprising:

generating, by network equipment comprising a processor, a first encrypted data stream associated with first information and a second encrypted data stream associated with second information;

generating, by the network equipment, a first hash code corresponding to the first encrypted data stream and a second hash code corresponding to the second encrypted data stream, wherein a decryption key corresponding to the first encrypted data stream comprises a combination of a key associated with a first network device and the second hash code;

sending, by the network equipment via a network to a group of network devices comprising the first network device and a second network device, the first encrypted data stream, the second encrypted data stream, the first hash code, and the second hash code, wherein the first network device deletes the second encrypted data stream after the first network device hashes the second encrypted data stream; and in response to the second network device being determined not to have received the second hash code within a defined threshold time, determining, by the network equipment, that the first network device is unauthorized to use the network.

18. The method of claim 17, wherein the network equipment comprises an optical line terminal.

19. The method of claim 17, wherein the first network device comprises a first optical network terminal and the second network device comprises a second optical network terminal.

20. The method of claim 17, wherein the network comprises a fiber optic network, and wherein the first network device sends the second hash code to the second network device via a wireless radio access network.

* * * * *